3,786,079
PREPARATION OF COPPER COMPOUND AND
PRODUCT THEREOF
Toyozo Yonezawa, Kyoto, Japan, assignor to Sanyo
Chemical Co., Ltd., Kyoto, Japan
No Drawing. Continuation of abandoned application Ser.
No. 846,222, July 30, 1969. This application Sept. 20,
1971, Ser. No. 182,173
Claims priority, application Japan, Aug. 6, 1968,
43/55,256; May 9, 1969, 44/35,137
Int. Cl. C07f 1/08
U.S. Cl. 260—438.1
2 Claims

ABSTRACT OF THE DISCLOSURE

The compound of the formula:

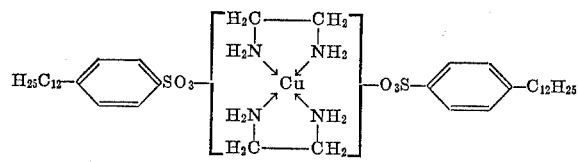

is produced by reacting an aqueous solution of p-dodecylbenzene sulfonate with cupric chloride at 80 to 90° C. to form cupric p-dodecylbenzene sulfonate, which is reacted in methanol with ethylene diamine to form bis ethylenediamine copper(II) p-dodecylbenzene sulfonate. The compound is useful as an agricultural bactericide and insecticide.

---

This application is a continuation of application Ser. No. 846,222, filed July 30, 1969, now abandoned.

DETAILED DESCRIPTION OF INVENTION

This invention relates to a method for preparing bactericides and insecticides for agricultural use, which is characterized by the formation of coordinated or chelated metal complexes.

The metal chelate is defined as a compound having heterocyclic structure which is composed of metal atom and polydentate ligands. The industrial applications of metal chelates are just at the beginning. At present, they are used in the scientific studies, for instance as a catalyst in biochemical studies or as the chelatemetry in the field of analytical chemistry. On the other hand, owing to their characteristic solubilities in water (some are very soluble and some are insoluble) and their characteristic stabilities, they have just opened the way of applications in softening hard water (ion exchanger), washing agent for various materials (masking effect for metal ion) and pigment such as phthalocyanine blue. However, little has been developed in the field of synthesis and industrial application of general organo- or organo-high-molecular weight chelate compounds, excepting a few examples such as some kinds of agricultural chemicals. As a chemical having metal chelate, we know dithiocarbamate type bactericides, which are famous for their low solubility in water, such as salt of zinc or manganese and also know quinoline copper.

The inventor has studied for stabilizing the coordination compounds having bactericidal effect, especially on metal chelates. It has been confirmed that the salts composed of benzenesulfonic acid or one of its derivatives, such as those substituted by alkyl, hydroxyl or halogens, and heavy metal complex obtained by adding such ligands as aliphatic and aromatic mono-, diamines, heterocyclic nitrogen containing compounds (pyridine, quinoline, acridine, etc.) or ethanolamine etc., have an excellent antibacteria and antiinsect effects. The inventor continued the study and has also confirmed that the salts, which are composed of one of the derivatives of benzenesulfonic acid substituted by amino, nitro, cyano or alkoxy (especially lower homologs) and metal complexes obtained from copper, zinc, nickel, mercury, tin, lead, iron, manganese ions by adding such organic ligands as ethylenediamine, trimethylamine, pyridine, quinoline, acridine, ethanolamine, thiourea etc., are also excellent bactericides and insecticides.

Some examples of the bactericides and insecticides found by the present invention are shown below with procedures for preparation and their effect on bacteria and insect.

(A) Metal complex salts having nitrogen containing ligands:

(1) p-dodecylbenzenesulfonic acid copper ethylenediamine chelate
(2) p-hydroxy-m-nonylbenzenesulfonic acid lead trimethylamine coordination compound
(3) p-chlorobenzenesulfonic acid nickel pyridine coordination compound
(4) p-methyl - o - chlorobenzenesulfonic acid manganese quinoline coordination compound
(5) benzenesulfonic acid mercury acridine coordination compound
(6) p-dodecylbenzenesulfonic acid tin ethylenediamine chelate
(7) p-dodecylbenzenesulfonic acid iron trimethylamine coordination compound
(8) p-nitroaniline-o-sulfonic acid copper ethylenediamine chelate
(9) m-nitrobenzenesulfonic acid lead trimethylamine coordination compound
(10) sulfanilic acid nickel pyridine coordination compound
(11) p-cyanobenzenesulfonic acid manganese quinoline coordination compound
(12) sulfanilic acid mercury acridine coordination compound
(13) p-methoxybenzenesulfonic acid tin ethylenediamine chelate
(14) m-nitrobenzenesulfonic acid iron trimethylamine coordination compound (B) Metal complex salts having oxygen and nitrogen containing ligands:

(1) p - hydroxy - o - nonylbenzenesulfonic acid copper ethanolamine coordination compound
(2) sulfanilic acid copper ethanolamine coordination compound (C) Metal complex salts having nitrogen and sulphur containing ligands:

(1) p-dodecylbenzenesulfonic acid zinc thiourea chelate
(2) m-nitrobenzenesulfonic acid zinc thiourea chelate It is possible to obtain the similar compounds as those mentioned above with $C_1$-$C_{18}$ alkyl groups.

EXAMPLE 1

Procedure for preparing p-dodecylbenzenesulfonic acid bis(ethylenediamine) copper(II) complex salt (see Reaction Formula 1).

Reaction Formula 1:

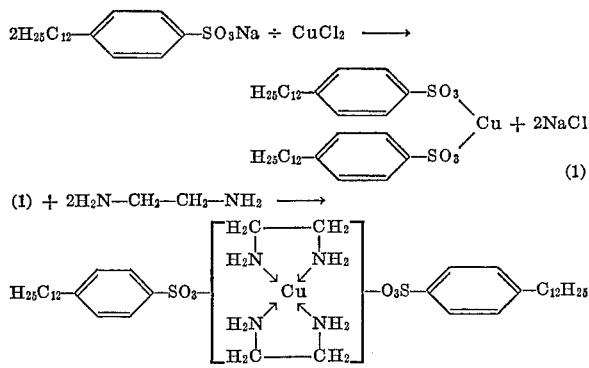

Seven hundred and fifty grams of p-dodecylbenzenesulfonic acid sodium salt (containing water, purity: 60%) were dissolved in 3 liters of water. The solution was kept at temperatures between 80 and 90° C. on a waterbath and 110.8 g. of cupric chloride dissolved in 1.5 liters of water were dropped therein under vigorous stirring in one hour. After the dropping was completed, the mixture was further heated under stirring at the temperature for about 30 minutes and then was cooled and filtered. The precipitation thus obtained was dissolved in 1.5 liters of hot water and cooled to be recrystallized. Approximately 760 g. of moist refined product were obtained. The refined product was dissolved in 300 g. of methanol and the copper content of the solution was determined conductometrically. A necessary amount of methanol (30 g.) was added, then 1080 g. of solution containing 1.73% of copper was obtained. The solution was added with 35.4 g. of ethylenediamine (2 moles for one atom of copper), then the color of the solution changed from green to blue.

The above operations brought about 115 g. of 22% solution of p-dodecylbenzenesulfonic acid bis(ethylenediamine) copper(II) complex salt. This solution having pH of 4.8 and specific gravity of 0.995 is usable as a commercial product.

EXAMPLE 2

Procedure for preparing p-dodecylbenzenesulfonic acid bis(thiourea) zinc complex salt (see Reaction Formula 2).

Reaction Formula 2

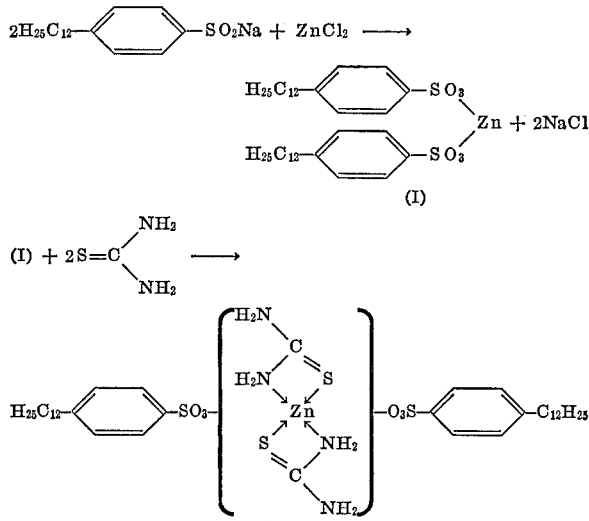

Eight hundred and seventy grams of p-dodecylbenzenesulfonic acid sodium salt (containing water, purity: 60%) were dissolved in 600 ml. of water. The solution was kept at temperatures between 85–95° C. on a waterbath and 105 g. of zinc chloride dissolved in 250 ml. of water was dropped therein under stirring in about one hour and was heated further for 30 minutes and then cooled and filtered. The solid product was dissolved by adding approximately 500 ml. of hot water and then purified by recrystallization. Eight hundred and fifty grams of moist refined product was obtained. The refined product was dissolved in 250 g. of methanol. With an aliquot portion of this solution zinc was determined by the di-ammonium hydrogen phosphate method. A required amount (50 g.) of methanol was added to the main solution and then 1150 g. of solution containing 1.55% zinc was obtained. To the solution 47.0 g. of thiourea dissolved in 50 g. of methanol was added and then about 1200 g. of pale yellow colored solution containing 20% of p-dodecylbenzenesulfonic acid bis(thiourea)zinc(II) complex salt was obtained. The solution having pH of 4.2 and specific gravity of 0.98 is usable as a commercial product.

The bactericidal effects of the product are shown below.

| Chemicals tested [1] | Dilution multiplication [2] | Disease development, percent | | | Average, percent |
|---|---|---|---|---|---|
| | | (1) | (2) | (3) | |
| ABS-Cu | 500 | 26 | 19 | 28 | 24.3 |
| ABS-Cu-en | 500 | 18 | 14 | 15 | 15.7 |
| ABS-Cu-2en | 500 | 14 | 17 | 8 | 13.0 |

[1] ABS and en denote dodecylbenzenesulfonic acid and ethylenediamine, respectively.
[2] A solution containing 20% of the chemicals was diluted.

These tests were carried out at Blight Damage Laboratory, Gardening Experimental Station, Okitsu Branch, Ministry of Agriculture and Forestry, Shizuoka Prefecture, Japan by the following procedures. Three pots of Chinese Citrons budded 15 days before were used for the individual tests. The buds were sprayed with 500 ml. of the chemicals by use of a hand sprayer. After being air-dried the plants were inoculated with a suspension of Xanthomonas cityi (Hasse) Dowson of concentration of $10^7$ per ml. by spraying. The plants were kept in a greenhouse for one night and then placed out of doors for one month. After these treatments, the plants were examined for their attacked leaves. The degree of attack (disease development) were classified into four degrees, that is zero-three, and the grade of the disease development of the plants was calculated by the following formula.

$$\text{Grade of disease development} + = \frac{n_1 + 2n_2 + 3n_3}{3N} \times 100$$

where, $n_1$, $n_2$ and $n_3$ represent the numbers of the leaves attacked up to the corresponding degree, respectively, and N represents the total number of leaves examined.

The insecticidal effects of the product are shown below.

| Chemicals tested [1] | Dilution multiplication [2] | Survival percent (repeated) | | | Average survival, percent | Corrected lethal percent [3] |
|---|---|---|---|---|---|---|
| | | I | II | III | | |
| ABS-Cu | 500 | 9.7 | 0.5 | 1.9 | 3.8 | 95.8 |
| ABS-Cu-en | 500 | 4.8 | 0 | 1.2 | 2.0 | 97.8 |
| ABS-Cu-2en | 500 | 0 | 0 | 0.3 | 0.1 | 99.8 |
| Morestan | 1,000 | 1.2 | 0.4 | 0 | 0.5 | 99.4 |
| Untreated | | 94.6 | 88.9 | 89.9 | 91.1 | |

Footnotes 1 and 2 refer to the preceding table.

[3] Corrected lethal percent $= \frac{Q^1 - Q^2}{Q^1} \times 100$.

These experiments were carried out in the experimental field of Sanyo Kagaku Co., Ltd., Koyoto, Jana. The insect tested was Tetranychus urticae Koch and the testing method was as follows.

Leaves of cucumber parasitized with Tetranychus urticae Koch were immersed in the test solution of the chemicals for 3 seconds and then transferred in Petri dishes. After 24 hours the number of survivals was determined. Three observations were carried out for each experimental condition with insects which have been never treated with effective insecticide.

It was confirmed that the insecticidal effect was high in the order of ABS-Cu-en and ABS-Cu. ABS-Cu-2en, Alkyl($C_8$-$C_{12}$) benzenesulfonic acid bis(ethylenediamine) copper(II) complex salt, has a comparable or superior effect of Morestan (6-methyl quinoxaline 2,3-dithiocarbonate).

EXAMPLE 3

Procedure for preparing m-nitrobenzenesulfonic acid bis(ethylenediamine) zinc(II) complex salt (see Reaction Formula 3).

Reaction Formula 3

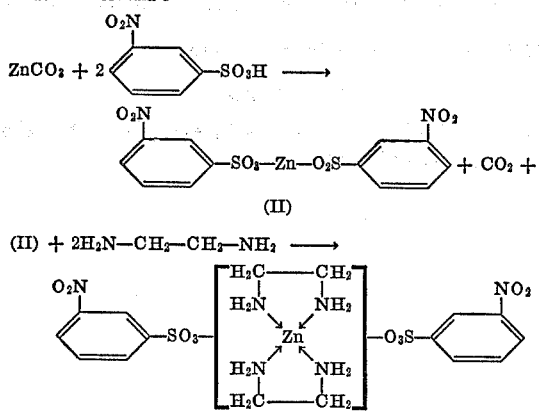

Seventeen grams of zinc carbonate was suspended in 170 ml. of water and 50 g. of m-nitrobenzenesulfonic acid dissolved in 500 ml. of warm water was dropped therein and the mixture was kept at temperatures between 80 and 85° C. under agitation. The dropping was completed within about 30 minutes and the mixture thus formed was stirred further for about 2 hours at the temperature. While the mixture was warm, unreacted solids were filtered off and the filtered solution was cooled down to room temperature. Thirty grams of white crystalline product was obtained. With precisely 150 mg. of the material, zinc was determined by the chelate titration. The total crystal was dissolved in 190 ml. of water and 220 g. of solution containing 1.50% of zinc was obtained. To this solution 6.1 g. of ethylenediamine was added. Through these operations 226 g. of a pale yellow colored solution of m-nitrobenzenesulfonic acid bis(ethylenediamine) zinc(II) complex salt was obtained. This product of pH of 5.4 and specific gravity of 1.118 is a usable product.

Procedure for preparing sulfanilic acid bis(ethylenediamine) zinc(II) complex salt (see Reaction Formula 4).

Reaction Formula 4

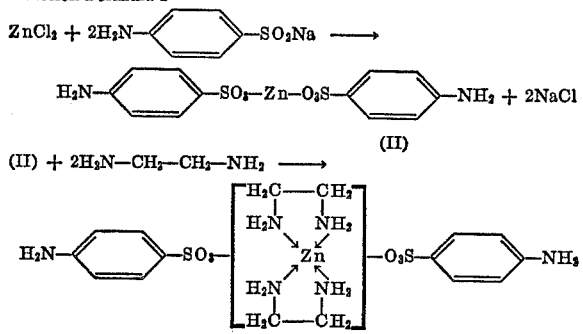

Eighteen grams of zinc chloride were dissolved in 100 ml. of water. Fifty grams of sulfanilic acid sodium salt dissolved in 500 ml. of warm water were dropped into the solution kept at temperatures between 60 and 70° C. After the dropping was completed in about 30 minutes, the mixture was stirred at the same temperature for about 2 hours. The solution was concentrated by heating to approximately 100 ml. and then cooled down to room temperature. The solid separated was filtered off and was recrystallized from a small amount of water. The yield was 26 g. One hundred and fifty milligrams of the solid were dissolved in 50 ml. of water and was titrated with EDTA using EBT as an indicator in a buffered solution of pH of 10. Thus zinc was determined. The total solid was dissolved in 140 g. of water, thereby 166 g. of solution containing 1.50% of zinc was obtained. To this solution 4.6 g. of ethylenediamine was added. Through these operations 171 g. of a pale yellow colored solution containing 10.6% sulfanilic acid bis(ethylenediamine) zinc(II) complex salt was obtained. This solution of pH of 6.0 and specific gravity of 1.110 will be put on market.

The other chelate and or coordination complex salts of copper, nickel, mercury, tin, lead, iron, and manganese can be prepared by the following procedures. Heavy metal salts of organic sulfonic acid, such as sulfanilic, nitrobenzenesulfonic, cyanobenzenesulfonic and methoxybenzenesulfonic acid, etc., were obtained from corresponding inorganic salts of $Cu^2$, $Ni^2$, $Sn^2$, $Hg^2$, $Pb^2$, $Fe^2$ and $Mn^2$. The metal salts thus obtained are reacted with compounds which make coordination bonds with metal such as those containing nitrogen (monoamine, diamine, pyridine, quinoline, acridine, etc.), those containing oxygen and nitrogen (ethanolamine etc). and those containing nitrogen and sulphur (thiourea etc.).

In the ways mentioned above, it is possible to prepare various kinds of chelate or coordination compounds in the categories of A, B and C.

Comparison tests for anti-bacterial property made on the compounds of Examples 3 and 4 are summarized in the following table.

| Chemicals tested | Concentration of metal (p.p.m.) | Number of spore examined [1] | Average percent of germinated | Corrected ungerminated, percent |
|---|---|---|---|---|
| Sulfanilic acid zinc salt (reference) | 16.3 | 314 | 59.0 | 36.9 |
| Sulfanilic acid bis(ethylenediamine) zinc(II) complex salt | 15.7 | 315 | 26.3 | 71.9 |
| m-Nitrobenzenesulfonic acid zinc salt (reference) | 16.0 | 322 | 56.0 | 40.1 |
| m-Nitrobenzenesulfonic acid bis(ethylenediamine) zinc(II) complex salt | 14.4 | 309 | 29.6 | 68.3 |
| Mercuric chloride (reference) | 2.5 | 317 | 44.7 | 54.6 |
| Untreated | | 306 | 98.5 | |

[1] Average of 3 observations.

These examinations were carried out in the laboratory of Sanyo Kagaku Co. Ltd., Kyoto, Japan.

Examination method: Conidia of Helminthosporium oryzae Breda et Haan were prepared by culturing on an agar plate media of potato containing 2% of dextrose (PDA) for 7 days at 28° C.

A conidia suspension in sterilized distilled water was prepared and it was filtered through a cotton gauze. Then the suspension was centrifuged twice at 1000 r.p.m. for 2 minutes. The concentration of conidia was adjusted to $10^5$ per ml. (determined by a Thoma's globle counter). To this suspension 0.1% of dextrose was added.

A drop of 0.05 ml. of the test solution was placed on a slide glass. After air-dried, 0.05 ml. of the conidia suspension was dropped on it. The glass was brought into a wet Petri dish kept for 20 hours at 28° C.

The number of germinated and ungerminated conidia were determined under a microscope. Corrected following equation.

$$\text{Corrected ungerminated percentage} = \frac{a-b}{a} \times 100$$

$a$; germinated percent for untreated section $b$; germinated percent for treated section.

What is claimed is:
1. A compound of the formula

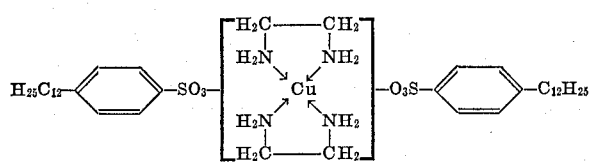

2. A process for the production of the compound of claim 1, which comprises reacting an aqueous solution of p-dodecylbenzene sulfonate with cupric chloride at 80 to 90° C. to form cupric p-dodecylbenzene sulfonate, which is reacted in methanol with ethylene diamine to form bis ethylenediamine copper(II) p-dodecylbenzene sulfonate.

References Cited

UNITED STATES PATENTS

| | | | |
|---|---|---|---|
| 2,864,742 | 12/1958 | Whetstone et al. | 260—438.1 |
| 2,455,687 | 12/1948 | Liberethson | 260—438.1 |
| 2,897,114 | 7/1959 | Sauls | 424—294 |
| 2,924,552 | 2/1960 | Harwood | 424—294 |
| 2,928,856 | 3/1960 | Harwood | 424—294 |
| 2,977,279 | 3/1961 | Kosmin | 424—294 |

FOREIGN PATENTS

| | | | |
|---|---|---|---|
| 1,057,106 | 5/1959 | Germany | 424—294 |

OTHER REFERENCES

Black, Aust. J. Chem., vol. 20, pp. 2275–2277 (1967).

HELEN M. S. SNEED, Primary Examiner

U.S. Cl. X.R.

260—429, 429.7, 429.9, 433, 439; 424—245, 287, 288, 289, 291, 292, 294, 295